UNITED STATES PATENT OFFICE.

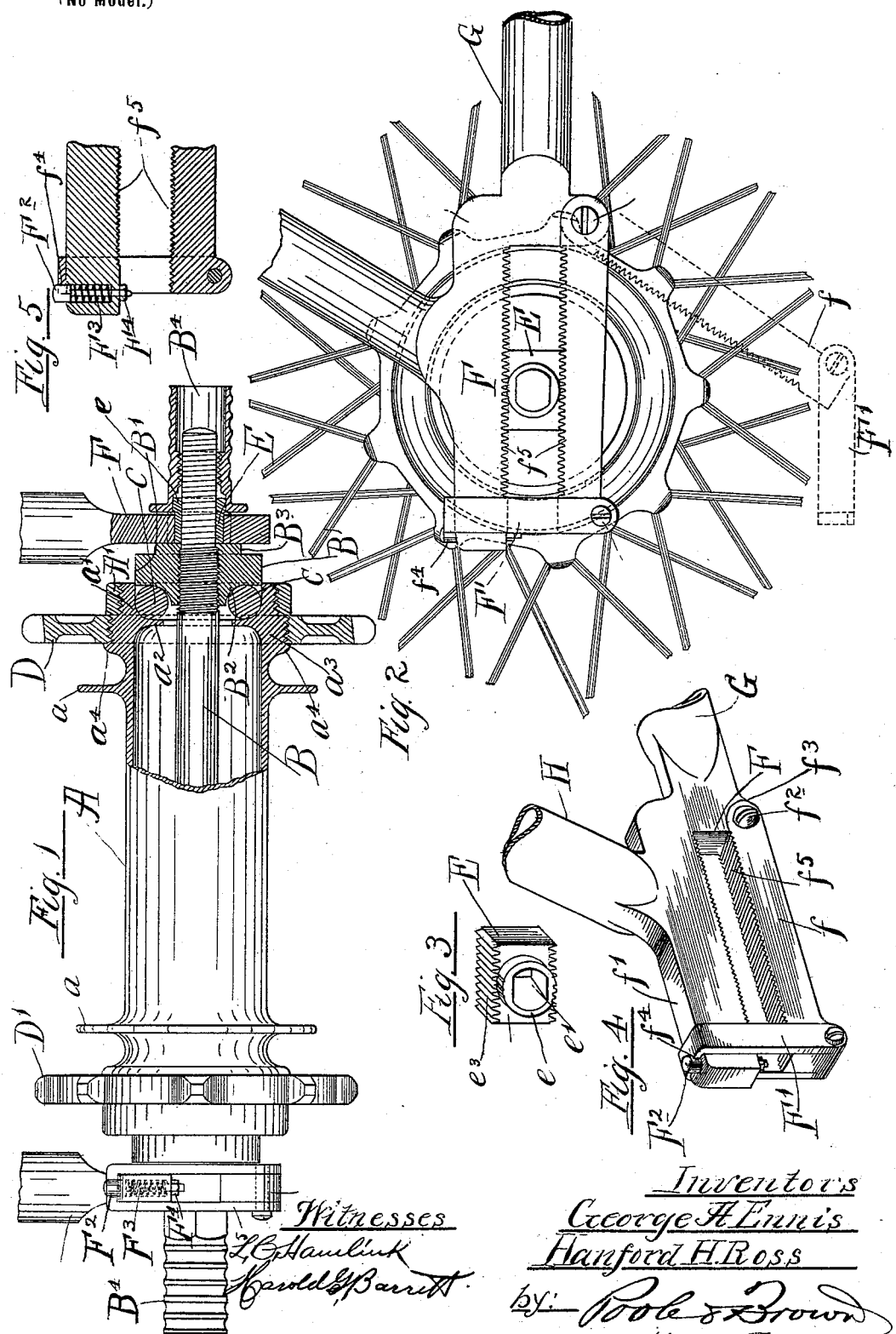

GEORGE A. ENNIS AND HANFORD H. ROSS, OF LIVINGSTON, MONTANA.

BICYCLE.

SPECIFICATION forming part of Letters Patent No. 618,855, dated February 7, 1899.

Application filed October 15, 1896. Serial No. 608,945. (No model.)

*To all whom it may concern:*

Be it known that we, GEORGE A. ENNIS and HANFORD H. ROSS, of Livingston, in the county of Park and State of Montana, have invented certain new and useful Improvements in Bicycles; and we do hereby declare that the following is a full, clear, and exact description thereof, reference being had to the accompanying drawings, and to the letters of reference marked thereon, which form a part of this specification.

This invention relates to improvements in bicycles, and refers to an improved chain-adjusting device for bicycles of that class which is located in the fitting or junction-piece by which the rear members of the frame are joined, and refers also to an improvement in such junction-pieces.

The invention consists generally in providing the rear fitting or junction-piece of the bicycle-frame with a movable part or jaw, which is pivotally attached to the stationary part of the fitting in such manner as to provide between the same when said part is in its normal or closed position a slot, and providing a bearing-block which rests in said slot, which block is provided with an aperture, within which the end of the axle is secured, said parts being provided with means for adjusting the position of the block within the slot to vary the tension upon the driving-chain.

The invention is especially applicable to and is herein shown in connection with a bicycle provided with a plurality of sprocket-wheels of different diameters, said sprocket-wheels being preferably located on opposite ends of the rear-wheel hub of the bicycle, so that by reversing the said rear wheel in the frame a sprocket-wheel of different diameter may be presented to the driving-chain and the gearing of the bicycle changed.

The object of the invention is to produce an extremely simple and cheap construction of the character mentioned; and the invention consists in the matters hereinafter described, and more particularly pointed out in the appended claims, and will be more readily understood by reference to the accompanying drawings, in which—

Figure 1 represents a longitudinal view, partly in section and partly in elevation, of the hub and axle of a rear wheel provided with our invention. Fig. 2 is a fragmentary view of the rear wheel of a bicycle and supported parts provided with our invention. Fig. 3 is a perspective view of the axle bearing-block removed. Fig. 4 is a perspective view of the rear and bottom fork junction-piece of the frame. Fig. 5 is a sectional detail taken on line 5 5 of Fig. 1.

As shown in said drawings, A designates the ordinary barrel-hub of the rear wheel of a bicycle, and B the supporting-axle thereof. The hub A is provided with the usual spoke-flanges $a$ $a$ near each end thereof. The hub in the instance shown is provided with integral ball-cups $a'$, formed by an annular inwardly-extending flange $a^2$, formed on the inner wall of the hub, near the ends thereof, and suitably rounded in the outer angle to conform to the shape of the balls C, which are adapted to rest therein. The hub is enlarged near its ends, as at $a^3$, and such enlarged portion is screw-threaded for the reception of the sprocket-gears D. A shoulder $a^4$ is left unthreaded, against which the gear D abuts when turned firmly in place. The extreme end of the hub is formed on a shorter radius than the portion $a^3$ and is exteriorly screw-threaded to receive a lock-nut A', by which the sprocket D is locked in position.

The above description has been directed to the end of the hub shown in section; but it will be understood that the opposite end thereof is a duplicate, with the exception that the sprocket-gear D' is made on a different radius than the gear of the opposite end.

The axle B is screw-threaded on each end for the reception of the interiorly-screw-threaded annular rings B', carrying on their inner sides the bearing-cones B², which, together with the oppositely-arranged ball-cup $a'$, constitute the ball-race for the ball-bearings C. Said annular rings B' are provided with offset portions B³, of suitable shape to be engaged by a wrench, by which said cones may be adjusted upon the bearings. The extreme ends of the axle are, as usual, flattened on the upper and lower sides and pass through and rest in correspondingly-shaped apertures in bearing-blocks E, which bearing-blocks engage the adjusting-slots in the junction-pieces F F. Tubular step-nuts B⁴

B⁴ engage the extreme outer ends of the axle B and, abutting against the junction-pieces F F, serve to hold them rigidly in position. The axle-blocks E are provided with annular flanges $e$, surrounding the apertures $e'$, and the steps are counterbored on their adjacent ends, so as to fit closely over said flanges, to thereby center said blocks on the axle and thus prevent the inner walls of the aperture wearing on the threads of the axle. The junction-pieces on each side of the wheel are exact duplicates, each consisting of two parallel rigid jaws $f\ f'$, which extend in prolongation of the bottom fork G and on each side of the central axis thereof, thus inclosing between them a narrow rectangular-shaped slot of uniform width, within which the bearing-block E and the axle supported thereby rest. The upper jaw $f'$ has integral connection with said bottom fork member G; but the lower jaw $f$ has pivotal connection therewith at its forward end by means of a bolt $f^2$, passing through flanges $f^3$ on said jaw and through the end of the bottom fork member G, thus forming a hinge at this point, by means of which the said jaw may be dropped down, as shown in dotted lines in Fig. 2, to release the bearing-block E and thereby the axle B. The rear fork H has integral connection with the upper side of the jaw $f'$, so as to form a rigid connection between said rear and bottom forks.

Means for locking the movable jaw $f$ parallel with the stationary jaw $f'$ is provided by means of a yoke F', hinged to the lower jaw and of such length as to fit closely upon the upper surface of the stationary jaw when the movable jaw is parallel therewith and to thereby clamp the axle-block E firmly between said jaws. In order to firmly secure the yoke F' in place upon the stationary jaw $f'$, a stop-pin F² is inserted in a vertical aperture formed transversely through the end of said jaw, so as to stand with its upper end between the yoke and outer end of the jaw, said jaw being slightly lengthened to provide for such construction. A spiral spring F³, encircling the pin within the aperture and bearing at its top on a shoulder formed on the upper part thereof, serves to maintain the pin in its elevated position, the lower end of the spring bearing on a shoulder formed in the lower part of the aperture, and a nut F⁴ on the end of the pin and abutting against the under side of the jaw holds it movably in position in said aperture. The yoke F' is shown as recessed on its upper side adjacent to the pin $f^4$. The adjacent faces of said jaws $f$ and $f'$ are provided throughout their length with transverse serrations or notches $f^5$, and the upper and lower sides of the axle-block E are provided with corresponding notches $e^3$, adapted to engage the notches of the jaws when said block is in place and thereby prevent movement of the block upon said jaws. In order to provide a more minute division of the notches and an exact adjustment of the driving-chain, the notches on the adjacent faces of the jaws are alternately arranged—that is to say, the notches or teeth on the lower jaw stand opposite the depressions or spaces of the upper jaw, and vice versa, and the upper and lower jaws of the axle-blocks are similarly formed. With this construction a more exact adjustment is possible, as if the chain be slightly tight or loose by reversing said block E it may be moved forward or backward, as the case may be, one-half space instead of one full space, as in a construction where the serrations are arranged in corresponding vertical planes. The construction not only enables a more exact adjustment of the chain, but permits the same adjustment with half the number of teeth as compared with a construction having the teeth or projections arranged in corresponding vertical planes.

By the construction shown and described it will be manifest that should it be desired to alter the gear of the machine it will only be necessary to depress the slot-pins $f^4$, withdraw the yokes F' from the stationary jaws $f'$, which permits the movable jaws $f$ to drop down, and thereby release the axle-block E and allow the axle and wheel carried thereby to be withdrawn therefrom. The wheel thus removed is next reversed, so as to present a sprocket-gear of different diameter to the action of the driving-chain and thus raise or lower the gear of the machine. In the present instance, as shown in Fig. 1, the machine is operated through the medium of the larger gear-wheel D', and the gear of the machine is therefore low and suitable for riding over uneven roads and against high winds and for leisurely riders; but if it is desired to increase the capacity of the machine for speed the rear wheel is removed in the manner described and reversed and the smaller sprocket-gear presented to the action of the driving-chain.

After the wheel has been reversed, as stated, it will obviously be necessary to again adjust the axle-blocks within the jaws, so as to adjust the chain to the larger or smaller sprocket-gear, as the case may be, this adjustment being provided for by the special construction of the axle-blocks and jaws described and without the necessity of lengthening the chain, as heretofore necessary.

The sprocket-gears D D' have been shown and described in connection with a chain; but it will be obvious that any other shape of driving-wheel may be used instead of a sprocket-wheel. It will also be obvious that the capacity of the wheel for variation in gear is not limited to the two sprocket-gears D and D' shown attached to the hub, since it is apparent that if a gear of a different size from the two which are attached to said hub is desirable such auxiliary gear may be placed upon the hub at one end thereof by first removing the lock-nut A' and the adjacent sprocket-gear.

We desire to be understood that our invention is not limited to the specific details herein shown and described, except as made the subject of specific claims.

We claim as our invention—

1. In a bicycle-frame, the combination with the rear members thereof and the wheel-supporting axle, of means for removably securing said axle in the frame comprising a stationary jaw rigid with said members, a movable jaw pivotally attached to the stationary jaw, means for locking the movable to the stationary jaw and an apertured bearing-block adapted to rest between said jaws within which block the axle is mounted, said bearing-block and the frame being provided with interfitting recesses and projections adapted to hold the block from movement when adjusted.

2. In a bicycle-frame the combination with the rear members thereof, jaws connected with said members, one of which is pivoted to the other, means for locking said jaws in parallel relation, and an axle bearing-block between said jaws, of means for adjusting the position of said block comprising recesses and projections upon the jaws and corresponding recesses and projections upon the block adapted to engage the recesses and projections upon the jaws, the recesses in one of said jaws being located opposite the projections in the other jaw, and the recesses in one surface of the block being located in like relation to the projections of the other surface thereof, said block being reversible to bring either side thereof in engagement with either jaw.

In testimony that we claim the foregoing as our invention we affix our signatures, in presence of two witnesses, this 6th day of October, A. D. 1896.

GEORGE A. ENNIS.
HANFORD H. ROSS.

Witnesses:
S. F. WHITNEY,
J. O. SAX.